United States Patent [19]

Ichikawa et al.

[11] Patent Number: 5,286,776
[45] Date of Patent: Feb. 15, 1994

[54] REINFORCED POLYPROPYLENE RESIN COMPOSITION CONTAINING GLASS FIBER, MICA AND COPOLYMER ADDITIVES

[75] Inventors: Shigeji Ichikawa; Katsunori Arai, both of Yoshimi; Hideyo Morita, Tokyo; Kouhei Ueno; Tatsushi Akou, both of Sakai, all of Japan

[73] Assignees: Kanesi Corporation, Saitama; Ube Industries, Ltd., Yamaguchi, both of Japan

[21] Appl. No.: 61,428

[22] Filed: Apr. 19, 1993

Related U.S. Application Data

[63] Continuation of Ser. No. 793,276, Nov. 8, 1991, abandoned.

[30] Foreign Application Priority Data

Nov. 8, 1990 [JP] Japan ................... 2-303555

[51] Int. Cl.$^5$ ............... C08J 5/08; C08K 3/34; C08L 23/12
[52] U.S. Cl. ................... 524/449; 524/504; 524/505; 523/220
[58] Field of Search ............ 524/449, 504, 505, 494; 523/220

[56] References Cited

U.S. PATENT DOCUMENTS 4,983,647 1/1991 Ueno et al. ............... 523/220
4,994,508 2/1991 Shikari et al. ............ 524/14

FOREIGN PATENT DOCUMENTS 2-151637 6/1990 Japan .
1587820 4/1981 United Kingdom .

*Primary Examiner*—Paul R. Michl
*Assistant Examiner*—U. K. Rajguru
*Attorney, Agent, or Firm*—Young & Thompson

[57] ABSTRACT

A reinforced polypropylene resin composition comprising the following components (a) to (e), the total amount of the components (b) and (c) being 2 to 14%:
 (a) 45 to 75% by weight of a polypropylene modified with an organosilane compound or an unsaturated acid, or a modified polypropylene containing an unmodified polypropylene;
 (b) 1 to 10% by weight of a noncrystalline ethylene-α-olefin copolymer;
 (c) 1 to 10% by weight of a styrenic hydrogenated block copolymer;
 (d) 2 to 12% by weight of a glass fiber having a mean fiber diameter of 4 to 15 μm; and
 (e) 15 to 35% by weight of a hard mica having a tensile strength of 30 kg/mm$^2$ or more, a mean particle diameter of 50 to 250 μm and an aspect ratio of 15 to 80.

6 Claims, No Drawings

REINFORCED POLYPROPYLENE RESIN COMPOSITION CONTAINING GLASS FIBER, MICA AND COPOLYMER ADDITIVES

This application is a continuation, of application No. 07/793,276, filed Nov. 8, 1991, now abandoned.

BACKGROUND OF THE INVENTION

1. Field of the Invention

The present invention relates to a reinforced polypropylene resin composition suitable particularly for instrument panels. More particularly, the present invention is concerned with a reinforced polypropylene resin composition having a good moldability and such well balanced properties that when it is molded into an article, the molded article has a tensile strength, a flexural modulus, a flexural strength, a hardness, a falling ball impact strength and other properties sufficient for practical use and is excellent in other properties and less susceptible to warpage deformation while maintaining the rigidity and impact resistance at a high temperature.

2. Description of the Prior Art

In order to improve the mechanical strength, rigidity, heat deformation resistance and other properties, it is a common practice to incorporate into polypropylene various fillers, for example, fibrous fillers such as glass fibers, carbon fibers, whiskers or metallic fibers, flaky fillers such as mica, talc, kaolinite or glass flake, and particulate fillers such as calcium carbonate, diatomaceous earth, alumina or glass beads. This method has already found wide applications.

Among the above-described fillers in various forms, the fibrous fillers exhibit a much better reinforcing effect than do the fillers in the other forms. Especially, a polypropylene resin composition reinforced with a glass fiber has found wide use in various fields as a material suitable for the production of a molded article having high rigidity and high heat resistance.

However, when the glass-fiber reinforced polypropylene resin composition is molded into particularly a large-sized article, the product is free from the problem in respect of the rigidity and heat resistance, but is liable to exhibit a larger "warpage" (deformation). This is a problem encountered when the glass-fiber reinforced polypropylene resin composition is used as a molding material for a large-sized molded article.

On the other hand, the use of a flaky filler and a particulate filler as a filler for the polypropylene resin reduces the warpage deformation. In this case, however, the effect of reinforcing the tensile strength, flexural modulus, flexural strength, Izod impact resistance and thermal rigidity is much smaller than that in the case where use is made of a fibrous filler. Nevertheless, since a molded article of a polypropylene resin composition reinforced with a flaky filler, such as mica or talc, exhibits a good rigidity, an attempt has been made on the combined use of a fibrous filler and a flaky filler. This is disclosed in, for example, Japanese Patent Laid-Open Nos. 36141/1977, 130647/1979, 16049/1980, 21438/1980, 45715/1980, 206659/1983, 226041/1984, 23432/1985 and 98758/1986.

Even the inventions disclosed in the above-described documents, however, cannot provide any molded article satisfying requirements for warpage and torsion.

SUMMARY OF THE INVENTION

An object of the present invention is to provide a reinforced polypropylene resin composition having a good moldability and such well-balanced properties that when it is molded into an article, the molded article has a tensile strength, a flexural modulus, a flexural strength, a hardness, a falling ball impact strength and other properties sufficient for practical use and is excellent in other properties and less susceptible to warpage deformation while maintaining the rigidity and impact resistance at a high temperature.

As a result of an intensive effort by the present inventors, it has been found that a reinforced polypropylene resin composition capable of attaining the above-described object can be obtained by incorporating a mica in a particular form and a particular elastomer each in a particular amount into a glass-fiber reinforced polypropylene resin.

The present invention has been made based on the above-described finding and provides a reinforced polypropylene resin composition comprising:

(a) 45 to 75% by weight (based on the whole composition; the same shall apply hereinafter) of a polypropylene modified with an organosilane compound or an unsaturated acid, or a modified polypropylene containing an unmodified polypropylene;

(b) 1 to 10% by weight of a noncrystalline ethylene-α-olefin copolymer;

(c) 1 to 10% by weight of a styrenic hydrogenated block copolymer;

(d) 2 to 12% by weight of a glass fiber having a mean fiber diameter of 4 to 15 μm; and (e) 15 to 35% by weight of a hard mica having a tensile strength of 30 kg/mm$^2$ or more, a mean particle diameter of 50 to 250 μm and an aspect ratio of 15 to 80, the total amount of said components (b) and (c) being 2 to 14%.

DETAILED DESCRIPTION OF THE INVENTION

In the present invention, a crystalline ethylenepropylene block copolymer having an ethylene content of 2 to 20% by weight, preferably 3 to 15% by weight, is used as the polypropylene constituting the component (a). When the ethylene content exceeds 20% by weight, the rigidity becomes insufficient, while when the ethylene content is less than 2% by weight, there is a fear of the impact resistance becoming insufficient.

The modified polypropylene as the component (a) is one modified with an organosilane compound or an unsaturated acid and can be prepared by subjecting polypropylene and an organosilane compound or an unsaturated acid to a melt kneading treatment in the presence of an organic peroxide.

The modified polypropylene containing an unmodified polypropylene as the component (a) comprises a combination of the above-described polypropylene with the above-described modified polypropylene, and the amount of the modified polypropylene in the component (a) is preferably 20% by weight based on the composition. When the amount of the modified polypropylene is less than 20% by weight, there is a fear of both the rigidity and the impact resistance becoming insufficient.

The organosilane compound used for preparing the modified polypropylene is an organosilane compound having an ethylenically unsaturated bond, such as a vinyl group, an allyl group or a methacryloxy group, and examples thereof include vinyltrimethoxysilane, vinyltriethoxysilane, vinyltris(β-methoxyethoxy)silane and γ-methacryloxypropyltrimethoxysilane.

An unsaturated acid may be used instead of the organosilane compound. Examples of the unsaturated acid include unsaturated carboxylic acids and their anhydrides, for example, acrylic acid, methacrylic acid, maleic acid, fumaric acid, citraconic acid, maleic anhydride and itaconic anhydride.

In the present invention, the amount of the organosilane compound or unsaturated acid preferably ranges from 0.01 to 3 parts by weight, still more preferably from 0.3 to 1 part by weight, based on 100 parts by weight of the crystalline ethylenepropylene block copolymer. When this amount exceeds 3 parts by weight, the appearance of the molding is liable to become poor, while when it is less than 0.01 part by weight, it is difficult to improve the properties.

It is preferred that the decomposition temperature for attaining a half-life period of one minute of the organic peroxide used for preparing the modified polypropylene be 200° C. or below. Examples of the organic peroxide of this type include tert-butyl peroxybenzoate, tert-butyl peroxymaleic acid, tert-butyl peroxylaurate, cyclohexanone peroxide, 2,5-dimethyl-2,5-di(benzoyl-peroxy)hexane, tert-butyl peroxyacetate, tert-butyl peroxybenzoate, methyl ethyl ketone peroxide, dicumyl peroxide, 2,5-dimethyl-2,5-di(tert-butyl-peroxy)hexane, tert-butyl cumyl peroxide and di-tert-butyl peroxide.

The amount of the organic peroxide is preferably 0.05 to 1 part by weight based on 100 parts by weight of the crystalline ethylene-propylene block copolymer.

Polypropylene and the organosilane compound or the unsaturated acid may be subjected to a melt-kneading treatment to prepare a modified polypropylene by various known methods. One simple and favorable method comprises adding the organosilane compound or unsaturated acid and the organic peroxide to polypropylene, agitating and mixing them by means of a Henschel mixer or the like, and melt kneading the mixture preferably at a temperature of 180° to 250° C. for 1 to 20 min through the use of an extruder.

The amount of the polypropylene as the component (a) is 45 to 75% by weight. When this amount is less than 45% by weight, the moldability becomes poor, while when it exceeds 75% by weight, the balance between the rigidity and the impact resistance becomes poor.

The noncrystalline ethylene-α-olefin copolymer as the component (b) is preferably one which has an ethylene content of 30 to 80% by weight and a Mooney viscosity, $ML_{1+4}$ (100° C.), of 10 to 150.

Examples of the copolymer include ethylene-propylene rubber, ethylene-butene-1 rubber, ethylene-propylene-butene rubber, ethylene-propylenediene rubber, and ethylene-butene-diene rubber. The amount of the copolymer is 1 to 10% by weight, preferably 1 to 8% by weight.

SEBS, SEPS, etc., are preferably used as the styrenic hydrogenated block copolymer as the component (C) of the present invention. They are commercially available under the trade names of Kraton G (Shell Kagaku Co., Ltd.), Taftec (Asahi Chemical Industry Co., Ltd.) and Septon (Kuraray Co., Ltd.). The amount of the copolymer is 1 to 10% by weight, preferably 1 to 8% by weight.

In the present invention, the total amount of the components (b) and (c) is 2 to 14% by weight, preferably 2 to 10% by weight. When the total amount is less than 2% by weight, the warpage becomes excessively large. On the other hand, when it exceeds 14% by weight, the rigidity becomes insufficient.

The glass fiber as the component (d) of the present invention is a chopped glass strand or a glass roving produced and commercially available for the reinforcement of resins, and the mean fiber diameter and the mean fiber length are 4 to 15 μm and 2 to 15 mm, respectively, particularly preferably 6 to 13 μm and 2 to 5 mm, respectively, from the viewpoint of the properties such as rigidity and impact resistance. When the mean fiber diameter is less than 4 μm, the fiber is broken during the kneading, so that the rigidity lowers. On the other hand, when it exceeds 15 μm, the glass fiber comes up on the molded article. When the mean fiber length is less than 2 mm, the rigidity becomes insufficient. On the other hand, when it exceeds 15 mm, the dispersibility lowers, so that the appearance of the molded article becomes poor.

The glass fiber is preferably one subjected to surface treatment with a coupling agent such as an aminosilane compound, an epoxysilane compound, a vinylsilane compound or a methacrylosilane compound.

The mean fiber length of the glass fiber in the final molded article is preferably 0.5 mm or more from the viewpoint of the properties. For this purpose, it is desirable to produce a glass fiber-reinforced polypropylene by a method wherein the melt kneading is conducted through the use of an extruder provided with a feedstock supply port at its cylinder in addition to an ordinary feedstock supply port while feeding the components (a), (b), (c) and (e) from the ordinary feedstock supply port and feeding the component (d) from the feedstock supply port provided at the cylinder.

The amount of the glass fiber is 2 to 12% by weight, preferably 3 to 10% by weight. When this amount is less than 2% by weight, the rigidity becomes insufficient, while when it exceeds 12% by weight, the warpage becomes excessively large.

The hard mica as the component (e) of the present invention should have a tensile strength of 30 kg/mm$^2$ or more and a mean particle diameter of 50 to 250 μm. When the tensile strength is less than 30 kg/mm$^2$, the rigidity of the molded article becomes insufficient. When the mean particle diameter is less than 50 μm, the rigidity of the molded article becomes insufficient and the warpage becomes excessively large, while when it exceeds 250 μm, the impact resistance becomes insufficient.

There is no particular limitation on the mica to be used in the composition of the present invention as far as the tensile strength, mean particle diameter and aspect ratio fall each within the above-described range, and the mica may be selected from a wide variety of mica such as biotite, muscovite and phlogopite.

Further, the mica to be used in the present invention may be one not subjected to any surface treatment or one subjected to a surface treatment with various surface treatments.

The mica is used in an amount of 15 to 35% by weight. When this amount is less than 15% by weight, the rigidity becomes insufficient, while when it exceeds 35% by weight, the impact resistance becomes insufficient.

In order to shorten the molding cycle in the injection molding of the composition of the present invention, it is preferred to incorporate 0.1 to 1.5 parts, preferably 0.2 to 1.0 part, of a nucleating agent in 100 parts of the composition of the present invention. Since the nucelating agent deforms the molded article, it is not usually used when the alleviation of the deformation is intended. Since the incorporation of the nuceleating agent enhances the rigidity but lowers the impact resistance, the nucleating agent is used for the material having a low rigidity. When the present inventors incorporated a nucelating agent having the above-described effect, however, they have obtained such quite unexpected results that a composition having a high rigidity and a short molding cycle can be prepared without detriment to the impact resistance.

In the composition of the present invention, the above-described components may be used in combination with various additives, for example, antioxidants, ultraviolet absorbers, antistatic agents, heat-resistant materials, nucleating agents and pigments.

The present invention will now be described in more detail with reference to the following Examples and Comparative Examples, though it is not limited to these only.

In order to evaluate the effect of the present invention, the properties were evaluated by the following methods.

Evaluation Methods Used in Examples and Comparative Examples

1. Melt flow rate (MFR) Determined according to JIS K7210 (230° C.).
2. Flexural strength (FS) Determined according to JIS K7203 (23° C.)
3. Flexural modulus (FM) Determined according to JIS K7203 (23° C.)
4. Izod impact resistance (notched) Determined according to JIS K7110 (23° C.)
5 Heat deformation temperature (HDT) Determined according to JIS K7207 (load: 18.5 kg/cm$^2$).
6. Degree of warpage deformation A flat plate having a thickness of 2 mm, a longitudinal length of 360 mm and a lateral length of 160 mm with a single-point gate (a side gate) provided at a position 75 mm inside from the end in the longitudinal direction was prepared by injection molding for use as a test piece. It was allowed to stand under conditions of a temperature of 23° C. and a humidity of 50% for 48 hr and put on a platen to measure the distance (height) from both ends of the test piece to the platen, and the average distance value was determined.

7. Aspect ratio

The aspect ratio was calculated from the mean particle diameter and mean thickness of the mica.

. Mean particle diameter of mica

Particle size distribution was measured through the use of a JIS sieve by means of a Model 200 LS air jet sieve, manufactured By Alpine, while the mean particle diameter was determined from the diameter on a logarithmic probability paper.

. Mean thickness of mica

The mean thickness was measured from the area of a monomolecular film by Kyodai Arakawa method.

. Mean aspect ratio

The mean aspect ratio was calculated by the following equation:

$$\text{mean aspect ratio} = \frac{\text{mean particle diameter}}{\text{mean thickness}}$$

8. Molding cycle

The molding cycle of expressed by the shortest molding cycle in the case where an instrument panel having a length of 1400 mm, a height of 300 mm, a width of 450 mm and a weight of 3.5 kg is injection-molded (molding machine: 2500 tons, Toshiba Kikai IS-2500DN, molding temperature: 230° C.).

9. Heat deformation resistance

The instrument panel was irradiated with infrared rays from an infrared lamp (Model T-10S manufactured by Tabai Espec Corp.) for 4 hr in such a manner that the surface temperature of the instrument panel and the atmosphere temperature reached 115°±3° C. and 80°±2° C., respectively, and then allowed to stand at room temperature.

Then, whether or not the degree of deformation (upward and downward) of the front end (garnish) of the instrument panel is larger than the reference value (3 mm) was determined.

G: a degree of deformation of 3 mm or less,
NG: a degree of deformation of more than 3 mm.

10. Impact resistance

An aluminum head form (165$\phi$, 6.8 kg) was impacted against the instrument panel at a speed of 24 km/hr according to FMVSS201,ECE No. 21 (testing apparatus: Model AI-150P, manufactured by Itoh Seiki Co., Ltd.). The impact resistance was evaluated based on whether or not the test piece can satisfy a requirement that the generation acceleration rate does not exceed 80 g for 3 msec or more without interruption and a requirement that no sharp edge occur on the impact face.

G: satisfied,
NG: not satisfied.

Example 1

100 parts by weight of a crystalline ethylene-propylene block copolymer having a MFR value of 1 g/10 min and an ethylene content of 7.6% by weight was mixed with 0.3 part by weight of itaconic anhydride, 0.15 part by weight of tert-butyl peroxybenzoate, 0.1 part of 2,6-di-tert-butyl-4-methylphenol and 0.1 part of pentaerythritol tetrakis[3-(3,5-di-tert-butyl-4-hydroxyphenyl)propionate], and the mixture was melt-kneaded in a single-screw extruder at 200° C. for 2 min to give a modified polypropylene grafted with itaconic anhydride (hereinafter referred to as "modified PP-1") having an MFR value of 12 g/10 min.

65% by weight of the modified PP-1, 3% by weight of an ethylene-propylene copolymer having an ethylene content of 75% by weight and a Mooney viscosity ML$_{1+4}$ (100° C.) of 70 (hereinafter referred to as "EPR"), 2% by weight of Kraton G1650 (a product of Shell Kagaku Co., Ltd.; hereinafter referred to as "St-1") as a styrenic hyerogenated block copolymer and 25% by weight of a mica having a tensile strength of 34 kg/mm$^2$, a mean particle diameter of 140 μm and a mean aspect ratio of 64 (a product of Repco; hereinafter referred to as "mica-1") were sufficiently mixed with each other in a tumbler and fed into an ordinary feedstock supply port of a twin-screw extruder equipped with two feedstock supply ports, while 5% by weight of a chopped strand glass fiber having a diameter of 10 μm and a length of 3 mm and subjected to surface treatment with 0.3% by weight of an aminosilane (a product of Nippon Electric Glass Co., Ltd.; hereinafter referred to as "GF") was fed after being metered from another feedstock supply port provided at the cylinder. The mixture was melted, kneaded, extruded at a temperature of 230° to 240° C., and pelletized. The resultant pellets were injection-molded to prepare a test piece for use in various evaluation tests. The evaluation test results are given in Table 1.

Example 2

The procedure of the Example 1 was repeated, except that the proportions of the modified PP-1, EPR, St-1 and GF were changed to 59% by wight, 1% by weight, 7% by weight and 8% by weight, respectively. The evaluation test results are given in Table 1.

Example 3

The procedure of the Example 1 was repeated, except that the proportion of the modified PP-1 was changed to 30% by weight, 30% by weight of a crystalline ethylene-propylene block copolymer having a MFR value of 9 g/10 min and an ethylene content of 7.5% by weight (hereinafter referred to as "PP") was added, the proportions of the St-1,GF and mica-1 were changed to 3% by weight, 6% by weight and 28% by weight, respectively, and 0.4 part by weight, based on 100 parts by weight of the whole components including 3% by weight of EPR, of a nucleating agent (aluminum p-tert butylbenzoate) was added. The evaluation test results are given in Table 1.

Example 4

The procedure of the Example 3 was repeated, except that the proportion of the unmodified PP was changed to 32% by weight, Septon 2003 (a product of Kuraray Co., Ltd.; hereinafter referred to as "St-2") was used as the styrenic hydrogenated block copolymer in an amount of 3% by weight and the proportions of FPR and GF were changed to 2% by weight and 5% by weight, respectively. The evaluation test results are given in Table 1.

Example 5

The procedure of the Example 4 was repeated, except that the amount of the nucleating agent was changed to 0.8 part by weight based on 100 parts by weight of the whole components wherein the proportions of the modified PP-1,unmodified PP, EPR, St-2,GF, mica-1 and a mica having a tensile strength of 39 kg/mm², a mean particle diameter of 60 μm and a mean aspect ratio of 37 (a product of Repco; hereinafter referred to as "mica-2") were 25% by weight, 47% by weight, 1% by weight, 1% by weight, 4% by weight, 12% by weight and 10% by weight, respectively. The evaluation test results are given in Table 1.

Example 6

The procedure of the Example 1 was repeated, except that 0.5 part by weight of γ-methacryloxypropyltrimethoxysilane was used instead of itaconic anhydride used in the Example 1 and 0.25 part by weight of tert-butyl peroxybenzoate was used, thereby preparing a modified polypropylene having a MFR value of 15 g/10 min grafted with a silane (hereinafter referred to as "modified PP-2"). Then, the procedure of the Example 5 was repeated, except that use was made of 38% by weight of the modified PP-2 instead of the modified PP-1 used in the Example 5, 14% by weight of the unmodified PP, 7% by weight of FPR, 2% by weight of St-1 instead of St-2, 6% by weight of GF, 10% by weight of mica-1, 23% by weight of mica 2 and 0.5% by weight of a nucleating agent. The evaluation test results are given in Table 1.

Comparative Example 1

The procedure of the Example 1 was repeated, except that the proportions of GF and mica-1 were changed to 15% by weight and 15% by weight, respectively. The evaluation test results are given in Table 2.

Comparative Example 2

The procedure of the Example 1 was repeated, except that the proportions of the modified PP-1 and St-1 were changed to 60% by weight and 10% by weight, respectively, and no EPR was added. The evaluation test results are given in Table 2.

Comparative Examples 3 and 4

The procedure of the Example 1 was repeated, except that in Comparative Example 3,the proportion of mica-1 was changed to 30% by weight and no GF was added, and in Comparative Example 4,the proportions of the modified PP-1 and mica-1 were changed to 50% by weight and 40% by weight, respectively. The evaluation test results are given in Table 2.

Comparative Examples 5 and 6

The procedure of the Example 4 was repeated, except that in Comparative Example 5,the proportion of the modified PP-1 was 35% by weight and neither EPR nor St-2 was added, and in Comparative Example 6,a mica-3 having a tensile strength of 18 kg/mm², a mean particle diameter of 160 μm and a mean aspect ratio of 65 (manufactured by Repco) was used instead of mica-1. The evaluation test results are given in Table 2.

Comparative Example 7

The procedure of the Example 1 was repeated, except that the proportion of EPR used in the Example 1 was changed to 5% by weight and no St-1 was used. The evaluation test results are given in Table 2.

TABLE 1

| | | Ex. No. | | | | | |
|---|---|---|---|---|---|---|---|
| | | 1 | 2 | 3 | 4 | 5 | 6 |
| mixing | modified PP-1 | 65 | 59 | 30 | 30 | 25 | — |
| ratio | modified PP-2 | — | — | — | — | — | 38 |
| (wt. ratio) | unmodified PP | — | — | 30 | 32 | 47 | 14 |
| | EPR | 3 | 1 | 3 | 2 | 1 | 7 |
| | St-1 | 2 | 7 | 3 | — | — | 2 |
| | St-2 | — | — | — | 3 | 1 | — |
| | GF | 5 | 8 | 6 | 5 | 4 | 6 |
| | mica-1 | 25 | 25 | 28 | 28 | 12 | 10 |
| | mica-2 | — | — | — | — | 10 | 23 |
| | nucleating agent | — | — | 0.4 | 0.4 | 0.8 | 0.5 |

TABLE 1-continued

|  |  | Ex. No. | | | | | |
| --- | --- | --- | --- | --- | --- | --- | --- |
|  |  | 1 | 2 | 3 | 4 | 5 | 6 |
| evaluation | MFR (g/10 min) | 3.5 | 3.2 | 4.5 | 4.7 | 5.1 | 3.6 |
|  | FS (kg/cm$^2$) | 682 | 700 | 705 | 697 | 631 | 710 |
|  | FM (kg/cm$^2$) | 40,500 | 42,800 | 44,000 | 43,200 | 39,300 | 43,900 |
|  | Izod (kg · cm/cm) | 11.5 | 12.0 | 10.0 | 10.6 | 8.4 | 10.3 |
|  | HDT (°C.) | 122 | 125 | 127 | 126 | 120 | 125 |
|  | warpage deformation (mm) | 0.12 | 0.33 | 0.20 | 0.19 | 0.21 | 0.10 |
|  | molding cycle (sec) | 82 | 88 | 76 | 76 | 70 | 77 |
|  | heat deformation resistance | G | G | G | G | G | G |
|  | impact resistance | G | G | G | G | G | G |

TABLE 2

|  |  | Comp. Ex. No. | | | | | | |
| --- | --- | --- | --- | --- | --- | --- | --- | --- |
|  |  | 1 | 2 | 3 | 4 | 5 | 6 | 7 |
| mixing ratio (wt. ratio) | modified PP-1 | 65 | 60 | 65 | 50 | 35 | 30 | 65 |
|  | modified PP-2 | — | — | — | — | — | — | — |
|  | unmodified PP | — | — | — | — | 32 | 32 | — |
|  | EPR | 3 | — | 3 | 3 | — | 2 | 5 |
|  | St-1 | 2 | 10 | 2 | 2 | — | — | — |
|  | St-2 | — | — | — | — | — | 3 | — |
|  | GF | 15 | 5 | — | 5 | 5 | 5 | 5 |
|  | mica-1 | 15 | 25 | 30 | 40 | 28 | — | 25 |
|  | mica-2 | — | — | — | — | — | — | — |
|  | mica-3 | — | — | — | — | — | 28 | — |
|  | nucleating agent | — | — | — | — | 0.4 | 0.4 | — |
| evaluation | MFR (g/10 min) | 3.4 | 3.3 | 3.6 | 3.1 | 4.9 | 4.5 | 3.5 |
|  | FS (kg/cm$^2$) | 758 | 583 | 615 | 764 | 768 | 650 | 668 |
|  | FM (kg/cm$^2$) | 46,500 | 35,100 | 36,300 | 51,000 | 49,600 | 40,200 | 39,600 |
|  | Izod (kg · cm/cm) | 12.6 | 13.5 | 8.0 | 6.3 | 6.0 | 9.0 | 10.0 |
|  | HDT (°C.) | 130 | 115 | 119 | 128 | 134 | 124 | 118 |
|  | warpage deformation (mm) | 4.8 | 0.11 | 0.10 | 0.11 | 2.9 | 0.53 | 0.36 |
|  | molding cycle (sec) | 83 | 86 | 88 | 85 | 75 | 77 | 84 |
|  | heat deformation resistance | NG | NG | G | G | NG | NG | NG |
|  | impact resistance | G | G | G | NG | NG | G | G |

The reinforced polypropylene resin composition of the present invention has such well-balanced properties that when it is molded into an article, the molded article has a tensile strength, a flexural modulus, a flexural strength, a hardness, a falling ball impact strength and other properties sufficient for practical use and is excellent in other properties and less susceptible to warpage deformation. In particular, when the reinforced polypropylene composition of the present invention is molded into a large-sized article, the molded article exhibits "warpage" significantly alleviated to such an extent as will bring about no problem in practical use as compared with the molded article prepared from the conventional polypropylene composition reinforced with a glass fiber.

Thus, the reinforced polypropylene composition of the present invention have attained the object unattainable by the conventional glass fiber-reinforced polypropylene composition, that is, the object of alleviating the "warpage" without lowering the strength and heat resistance of the molded article. For example, the reinforced polypropylene composition of the present invention is useful particularly as a reinforced polypropylene resin composition having a good moldability suitable for the production of a molded article used in applications where a molded article having a large size and being less susceptible to deformation is required, for example, core materials of instrument panels for automobile parts.

The reinforced polypropylene composition according to the present invention can be molded into an article having a high rigidity, a high heat resistance and a high impact resistance at a high temperature and a very small warpage deformation, which renders the composition of the present invention very suitable as a core material of an instrument panel for automobiles.

What is claimed is:

1. A reinforced polypropylene resin composition comprising:
   (a) 45 to 75% by weight of a polypropylene modified with an organosilane compound or an unsaturated acid, or a modified polypropylene containing an unmodified polypropylene;
   (b) 1 to 10% by weigh of a noncrystalline ethylene-α-olefin copolymer;

(c) 1 to 10% by weight of a styrenic hydrogenated block copolymer selected from the group consisting of SEBS and SEPS;

(d) 2 to 12% by weight of a glass fiber having a mean fiber diameter of 4 to 15 μm; and (e) 15 to 35% by weight of a hard mica having a tensile strength of 30 kg/mm² or more, a mean particle diameter of 50 to 250 μm and an aspect ratio of 15 to 80, the total amount of said components (b) and (c) being 2 to 14% by weight of said composition.

2. A reinforced polypropylene resin composition according to claim 1, wherein a nucleating agent is used in an amount of 0.1 to 1.5 parts (by weight; the based on 100 parts by weight of the total amount of said components (a) to (e).

3. A reinforced polypropylene resin composition according to claim 1, wherein the polypropylene constituting said component (a) is a crystalline ethylene-propylene block copolymer having an ethylene content of 2 to 20% by weight.

4. A reinforced polypropylene resin composition according to claim 1, wherein said component (b) is a noncrystalline ethylene-α-olefin copolymer having an ethylene content of 30 to 80% by weight and a Mooney viscosity $ML_{1+4}$ (100° C.) of 10 to 150.

5. A reinforced polypropylene resin composition according to claim 4, wherein said noncrystalline ethylene-α-olefin copolymer is ethylene-propylene rubber, ethylene-butene-1 rubber, ethylene-propylene-butene rubber, ethylene-propylene-diene rubber or ethylene-butene-diene rubber.

6. A reinforced polypropylene resin composition according to claim 1, wherein said component (c) is a glass fiber subjected to surface treatment with a coupling agent selected from the group consisting of an aminosilane compound, an epoxysilane compound, a vinylsilane compound and a methacrylosilane compound.

* * * * *